United States Patent
Tango et al.

(10) Patent No.: US 11,003,161 B2
(45) Date of Patent: May 11, 2021

(54) NUMERICAL CONTROLLER

(71) Applicant: FANUC CORPORATION, Yamanashi (JP)

(72) Inventors: Chikara Tango, Yamanashi (JP); Daisuke Uenishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/663,146

(22) Filed: Oct. 24, 2019

(65) Prior Publication Data

US 2020/0133228 A1 Apr. 30, 2020

(30) Foreign Application Priority Data

Oct. 31, 2018 (JP) .............................. JP2018-205920

(51) Int. Cl.
*G05B 19/18* (2006.01)
*G05B 19/4063* (2006.01)
*G05B 19/4155* (2006.01)
*G05B 19/416* (2006.01)
*G05B 19/4093* (2006.01)

(52) U.S. Cl.
CPC ... *G05B 19/4063* (2013.01); *G05B 19/40938* (2013.01); *G05B 19/416* (2013.01); *G05B 19/4155* (2013.01)

(58) Field of Classification Search
CPC ...... G05B 19/4063; G05B 2219/34095; G05B 2219/43203; G05B 2219/49074; G05B 19/4068; G05B 19/40938; G05B 19/4155; G05B 19/416
See application file for complete search history.

(56) References Cited

U.S. PATENT DOCUMENTS

| | | | | |
|---|---|---|---|---|
| 9,904,272 B2* | 2/2018 | Noda | ................... | G05B 19/406 |
| 2012/0010745 A1* | 1/2012 | Ide | ..................... | G05B 19/4163 |
| | | | | 700/177 |
| 2016/0363927 A1* | 12/2016 | Yoshida | ............ | G05B 19/4163 |

FOREIGN PATENT DOCUMENTS

| JP | S61-256407 A | 11/1986 |
|---|---|---|
| JP | H05-143145 A | 6/1993 |

(Continued)

OTHER PUBLICATIONS

An Office Action; "Notice of Reasons for Refusal", mailed by the Japanese Patent Office dated Dec. 8, 2020, which corresponds to Japanese Patent Application No. 2018-205920 and is related to U.S. Appl. No. 16/663,146; with English language translation.

*Primary Examiner* — Muhammad S Islam
(74) *Attorney, Agent, or Firm* — Studebaker & Brackett PC

(57) ABSTRACT

To provide a numerical controller that can produce high-quality machining with optimal machining conditions by reducing speed control abnormalities in order to stabilize feed rate, cutting speed and other factors. A numerical controller includes a speed reduction block detection unit that detects a speed reduction block that is a block at which the number of blocks to be looked ahead in a machining program relatively decreases, a speed information storage unit that calculates feed rate at each axis from a table feed rate at the speed reduction block and stores this speed information in a storage unit, and a speed information read unit that reads out the speed information from the storage unit and applies the speed information as the feed rate at each axis.

5 Claims, 9 Drawing Sheets

(56) References Cited

FOREIGN PATENT DOCUMENTS

| | | |
|---|---|---|
| JP | H10-254517 A | 9/1998 |
| JP | 2001-034320 A | 2/2001 |
| JP | 3723015 B2 | 12/2005 |
| JP | 2006-294053 A | 10/2006 |
| JP | 2007-094936 A | 4/2007 |
| JP | 2007-164509 A | 6/2007 |

\* cited by examiner

NUMERICAL CONTROLLER

This application is based on and claims the benefit of priority from Japanese Patent Application No. 2018-205920, filed on 31 Oct. 2018, the content of which is incorporated herein by reference.

BACKGROUND OF THE INVENTION

Field of the Invention

The present invention relates to a numerical controller.

Related Art

In the manufacturing industry, IT components and other devices are being manufactured on smaller scales and with higher precision, and interest in high-speed and high-precision machining is on the rise. In order to achieve even higher quality machining, there has been an increase in the number of workpiece machining programs for high-speed and high-precision machining that are created with tolerances on smaller orders.

Conventionally, machining programs with small tolerances could not realistically be used due to low computer processing power. However, in recent years, both computer performance and computer aided manufacturing (CAM) performance have improved to the point where machining programs with small tolerances can now be easily created. This trend is expected to grow in years to come.

One aspect other than tolerance that is important when producing high-quality machining is uniformizing minute straight lines. Machining quality is increased when vibration is reduced through stabilizing acceleration/deceleration at each axle. As a result, there has been an increase in the number of high-quality machining programs featuring even minute straight lines. Therefore, machining programs are now made up of more blocks.

In the prior art, a numerical controller looks ahead at programs and reads out and processes a program for blocks to be executed next according to the first in, first out (FIFO) method from a number of programs stored in advance equal to the look-ahead blocks. Then, the numerical controller determines an acceleration/deceleration operation and performs axis control.

However, such high-quality machining programs have the following problem. That is, the programs have short minute straight lines and fast command speed which means that, if the processing time for executing the program is shorter than the time required for look-ahead processing, the look-ahead blocks used to determine the acceleration/deceleration operation cannot be secured. As a result, acceleration/deceleration is not determined in consideration of program behavior and changes in speed are not constant and high-quality machining cannot be achieved.

FIG. 9 is a graph showing the difference in acceleration/deceleration over time when change in speed is unstable. As illustrated in FIG. 9, speed initially moves stably at a command speed of 6,000 mm/min. At 2,000 mm/min, there was insufficient processing time for executing the program and the look-ahead blocks used to determine the acceleration/deceleration operation could not be secured. Therefore, speed became unstable and moved slightly as indicated by the arrows in FIG. 9. Such behavior is particularly prominent when a machine tool has a large number of axes, such as in 5-axis machining, and when the numerical controller has limited processing power. These problems can be solved by increasing the processing power of the numerical controller used for looking ahead or executing machining programs. However, similar problems occur when command speed is further increased by making programs more detailed or updating machines.

In order to provide a solution to these problems, the invention described in Patent Document 1 discloses a technology in which a numerical controller monitors the amount of data in a buffer that is held by the FIFO method until analysis data consisting of analyzed NC data is used as acceleration/deceleration interpolation means. In particular, the technology determines that there is insufficient data when the amount of data predicted to exist in the buffer falls below a lower limit threshold value.

Patent Document 1: Japanese Patent No. 3723015

SUMMARY OF THE INVENTION

However, the technology disclosed in Patent Document 1 only increases the priority of the NC data analysis processing task when it is determined that there is insufficient data and is not compatible with individual speed control abnormalities.

It is an object of the present invention to provide a numerical controller that can produce high-quality machining with optimal machining conditions by reducing speed control abnormalities in order to stabilize feed rate, cutting speed and other factors.

(1) A numerical controller according to the present invention is a numerical controller (for example, a "numerical controller 100" to be described later) that is connected to a machine tool (for example, a "machine tool 200" to be described later) having axes and a storage device (for example, a "storage device 150" to be described later) and that controls the machine tool by executing a machining program that is made up of a plurality of blocks and that controls acceleration/deceleration of the axes, the numerical controller including: a program execution unit (for example, a "program execution unit 111" to be described later) that runs the machining program; a program look-ahead unit (for example, a "program look-ahead unit 112" to be described later) that looks ahead at the machining program in parallel with running the machining program; a speed reduction block detection unit that detects a speed reduction block in the machining program, where the speed reduction block is a block at which the number of blocks to be looked ahead relatively decreases; a speed information storage unit (for example, a "speed information storage unit 116" to be described later) that calculates feed rate at each of the axes from a table feed rate at the speed reduction block and stores speed information which is information on the feed rates in the storage unit; and a speed information read unit (for example, a "speed information read unit 118" to be described later) that reads out the speed information from the storage unit and applies the speed information as the feed rate at each of the axes.

(2) The numerical controller described in Item (1) may further include a flag addition unit (for example, a "flag addition unit 115" to be described later) that adds a flag to the speed reduction block; and a flag detection unit (for example, a flag detection unit 117" to be described later) that detects the flag while the machining program is being executed after the speed information has been stored in the storage device, wherein the speed information storage unit stores the speed information in the storage unit as a pair with the flag, and wherein, when the flag is detected, the speed information read unit reads out the speed information corresponding to the flag and applies the speed information to the feed rate at each axis.

(3) In the numerical controller described in Item (1) or (2), the speed reduction block detection unit may include: a look-ahead blocks calculation unit (for example, a "look-ahead blocks calculation unit 113" to be described later) that calculates a look-ahead blocks, which is the difference between a first sequence number that is the number of a block being executed by the program execution unit and a second sequence number that is the number of a block that is looked ahead by the program look-ahead unit while the machining program is being executed; and an exhaustion block detection unit (for example, an "exhaustion block detection unit 114" to be described later) that detects, as the speed reduction block, an exhaustion block, which is a block at which the look-ahead blocks falls below a prescribed value.

(4) In the numerical control device described in Item (1) or (2), the speed reduction block detection unit may include: a theoretical value calculation unit (for example, a "theoretical value calculation unit 119" to be described later) that calculates theoretical values per block in the processing time for the machining program from the feed rate of the machine tool and the lengths of minute straight lines that make up the machining path followed by the machine tool; a measured value calculation unit (for example, a "measured value calculation unit 120" to be described later) that calculates actually measured values per block in look-ahead time taken by the program look-ahead unit and the processing time for the machining program while the machining program is executed; and an abnormal block detection unit (for example, an "abnormal block detection unit 121" to be described later) that detects, as the speed reduction block, an abnormal block that is a block at which the result of subtracting the total of the theoretical values from the total of the measured values is more than a prescribed value.

(5) A numerical control system according to the present invention includes a plurality of the numerical controllers described in any one of Items (1) to (4) and the storage unit, in which the speed information stored in the storage unit is shared between the plurality of numerical controllers.

According to the present invention, it is possible to produce high-quality machining with optimal machining conditions by reducing speed control abnormalities in order to stabilize feed rate, cutting speed and other factors.

DETAILED DESCRIPTION OF THE INVENTION

1. First Embodiment

A first embodiment of the present invention is described with reference to FIGS. 1 to 6.

1.1 Configuration of Invention

Figure 1:
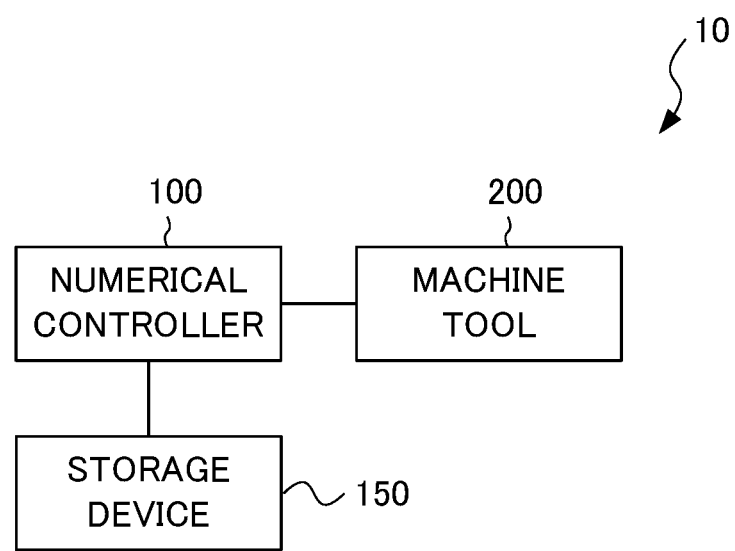
FIG. 1 is a diagram for illustrating the configuration of a control system including a numerical controller according to an embodiment of the present invention.

FIG. 1 illustrates the configuration of a control system 10 that includes a numerical controller 100 according to the present invention, a storage device 150 that stores information used when the numerical control device 100 performs control, and a machine tool 200 that is controlled by the numerical controller 100.

The numerical controller 100 is a machine that outputs an operation command to the machine tool 200 to numerically control the machine tool 200 using functions to be described later. A detailed description of the configuration and functions of the numerical controller 100 is provided later.

The storage device 150 stores information that is used when the numerical controller 100 performs control. In particular, the storage device 150 stores speed information that is used when the numerical controller 100 executes a machining program. The numerical controller 100 stores the speed information in the storage device 150 and reads out the stored speed information from the storage device 150.

The machine tool 200 is a device that performs predetermined machining such as cutting. The machine tool 200 includes a motor that is driven to machine workpiece and a spindle and a feed axis that are attached to the motor. The machine tool 200 also includes fixtures and tools that correspond to the axes. The motor of the machine tool 200 is driven on the basis of an operation command that is output from the numerical controller 100 such that the machine tool 200 performs predetermined machining. Herein, the contents of the predetermined machining are not particularly limited and types of machining other than cutting, such as grinding, polishing, rolling or forging, may also be employed.

Figure 2:
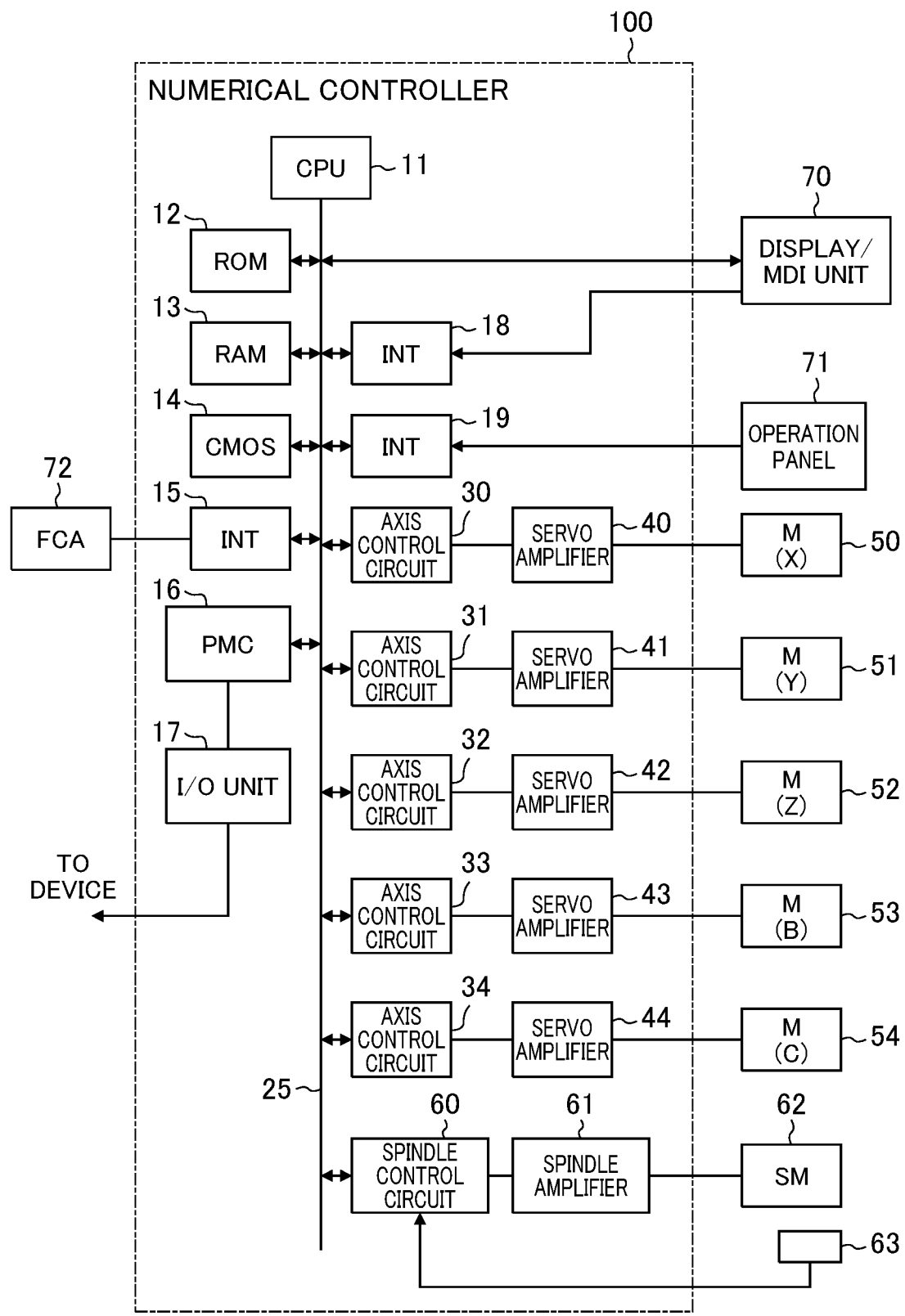
FIG. 2 is a diagram for illustrating the configuration of the numerical controller according to the embodiment of the present invention.

FIG. 2 illustrates an exemplary configuration of the numerical controller 100 according to the first embodiment of the present invention. The numerical controller 100 primarily includes a CPU 11, a ROM 12, a RAM 13, a CMOS 14, interfaces 15, 18 and 19, a programmable machine controller (PMC) 16, an I/O unit 17, axis control circuits 30 to 34, servo amplifiers 40 to 44, a spindle control circuit 60, and a spindle amplifier 61.

The CPU 11 is a processor that controls the entire numerical controller 100. The CPU 11 reads out a system program that is stored in the ROM 12 via a bus 25 and controls the entire numerical controller 100 according to the system program.

The RAM 13 stores temporary calculation data and display data and various types of data that is input by an operator using a display/MDI unit 70.

The CMOS memory 14 is a non-volatile memory that is backed up by a battery (not shown) and that retains its storage state even when power to the numerical controller 100 is shut off. The CMOS memory 14 stores a machining program that was read to the CMOS memory 14 via the interface 15, a machining program that was input to the CMOS memory 14 via the display/MDI unit 70, and other data.

The ROM 12 is pre-written with various types of system programs for executing processing for an edit mode required to create and edit machining programs and processing for automatic operation.

Various types of machining programs such as the machining programs for implementing the present invention can be input using the interface 15 or the display/MDI unit 70 and stored in the CMOS memory 14.

The interface 15 can connect the numerical controller 100 to an external device 72 such as an adaptor. Machining programs, various parameters and other data are read from the external device 72 side. Machining programs that are edited within the numerical controller 100 can be stored in external storage means using the external device 72.

The programmable machine controller (PMC) 16 outputs signals via the I/O unit 17 to an auxiliary device (for example, an actuator in the form of a robot hand used for replacing tools) for a machine tool using a sequence program stored in the numerical controller 100 and controls the device. The PMC 16 receives signals such as those for various switches on an operation panel provided in the body of the machine tool, and transmits those signals to the CPU 11 after executing required signal processing.

The display/MDI unit 70 is a manual data input device that includes components such as a display and a keyboard. The interface 18 receives commands and data from a keyboard in the display/MDI unit 70 and transfers those commands and data to the CPU 11. The interface 19 is connected to an operation panel 71. The operation panel 71 includes a manual pulse generator.

The axis control circuits 30 to 34 for each axis receive movement command amounts for each axis from the CPU 11 and output the commands for each axis to the servo amplifiers 40 to 44.

The servo amplifiers 40 to 44 receive these commands and drive servo motors 50 to 54 for each axis. Each servo motor 50 to 54 for each axis includes a position/speed detector. The position/speed detectors output position/speed feedback signals that are fed back to each axis control circuit 30 to 34 to perform feedback control for position/speed. Note that this position/speed feedback is omitted from the block diagrams.

The spindle control circuit 60 receives a spindle rotation command for the machine tool and outputs a spindle speed signal to the spindle amplifier 61. The spindle amplifier 61 receives the spindle speed signal and rotates the spindle motor 62 of the machine tool at the commanded rotational speed to drive the tool.

The spindle motor 62 is connected to a pulse encoder 63 by a gear, a belt, or another component. The pulse encoder 63 outputs a feedback pulse in synchronization with rotation of the spindle. The feedback pulse is read by the CPU 11 via the bus 25.

In the exemplary configuration of the numerical controller 100 illustrated in FIG. 2, five axis control circuits (axis control circuits 30 to 34) and five servo motors (servo motors 50 to 54) are illustrated. However, the present invention is not limited to this configuration and any number of axis control circuits and servo motors may be provided.

Figure 3:
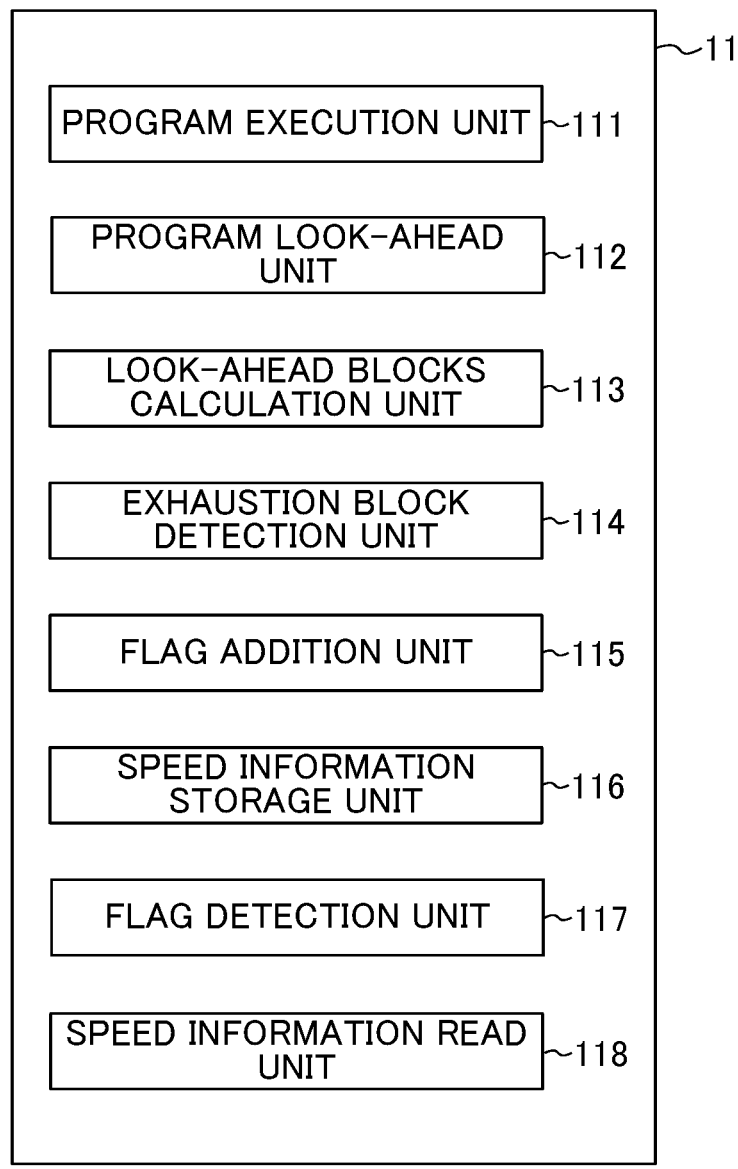
FIG. 3 is a diagram for illustrating function blocks for the numerical controller according to a first embodiment of the present invention.

FIG. 3 is a function block diagram for illustrating a function where the CPU 11 reads out system programs and application programs stored in the ROM 12 via the bus 25 and implements the present invention according to those system programs and application programs. The CPU 11 includes a program execution unit 111, a program look-ahead unit 112, a look-ahead blocks calculation unit 113, an exhaustion block detection unit 114, a flag addition unit 115, a speed information storage unit 116, a flag detection unit 117 and a speed information read unit 118.

The program execution unit 111 executes a machining program. More specifically, in this embodiment, the program execution unit 111 executes a simulation of the machining program. During this simulation, it is preferable that workpiece be placed on the machine tool 200 and the machine tool 200 be actually operated, as opposed to executing the machining program idly. This is because the difference in look-ahead blocks over time (to be described later) changes depending on the operating environment and the axis configuration of the machine tool 200.

In parallel with the simulation of the machining program executed by the program execution unit 111, the program look-ahead unit 112 looks ahead at the machining program before the simulation is executed.

The look-ahead blocks calculation unit 113 calculates the look-ahead blocks. This number is the difference between the sequence number of a block that is being executed by the program execution unit 111 and the sequence number of a block that is looked ahead by the program look-ahead unit 112 at the time when the first block is being executed.

Figure 4:
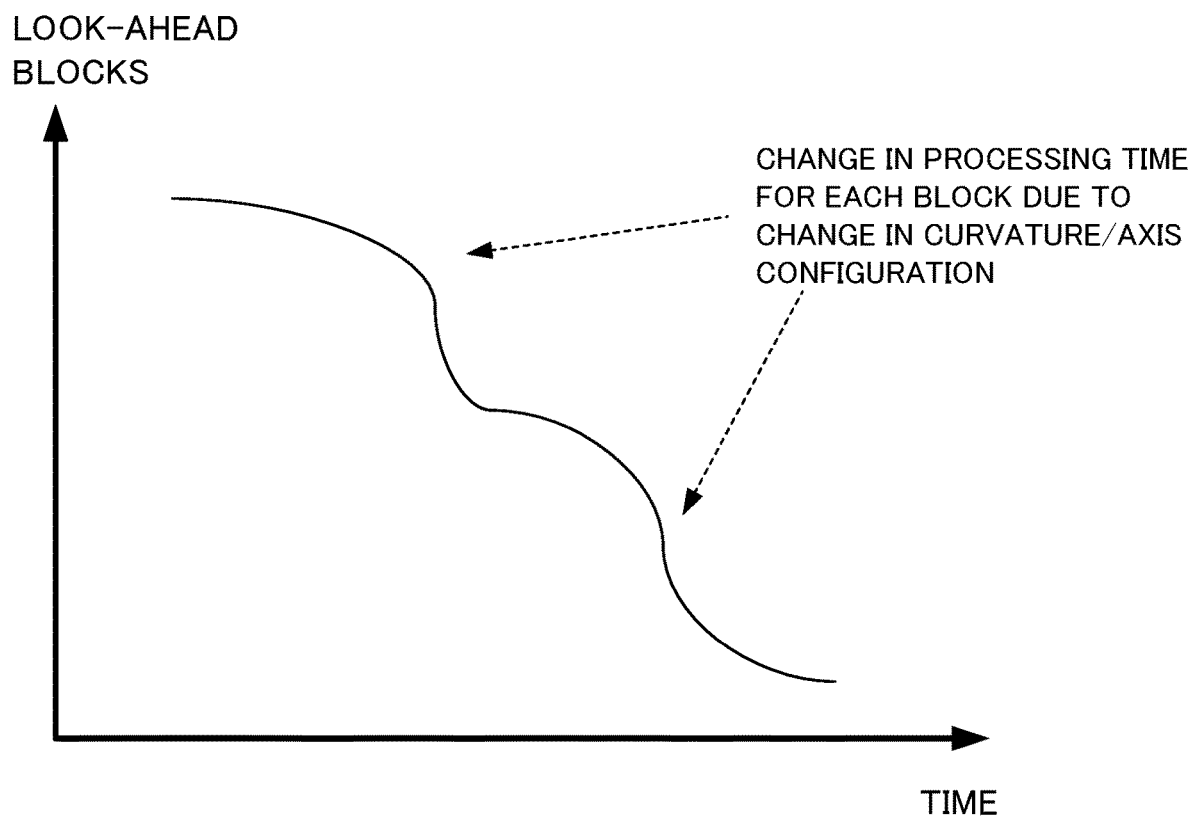
FIG. 4 is a graph for showing difference in look-ahead blocks over time.

FIG. 4 is a graph showing the difference in the look-ahead blocks over time. The look-ahead blocks is zero when the position of a block to be looked ahead by the program look-ahead unit 112 or the position of a block to be executed by the program execution unit 111 reaches the end of the machining program. However, the look-ahead blocks usually does not evenly decrease to zero. The rate of reduction of look-ahead blocks changes depending on the processing time for each block, which differs due to a change in the curvature of the machining path or the axis configuration.

The exhaustion block detection unit 114 compares the look-ahead blocks to a prescribed value and detects the block at the point when the look-ahead blocks falls below the prescribed value. This block is referred to as an "exhaustion block".

Herein, the look-ahead blocks calculation unit 113 and the exhaustion block detection unit 114 are collectively referred to as "speed reduction block detection unit". The "speed reduction block detection unit" detects a "speed reduction block," which is a block at which the number of blocks to be looked ahead in the machining program relatively decreases. In the first embodiment, the exhaustion block detection unit 114 detects the above-described "exhaustion block" as the "speed reduction block".

The flag addition unit 115 adds a flag to the above-described "speed reduction block" (the "exhaustion block" in the first embodiment) in the machining program. When a flag has been added in the machining program, the flag detection unit 117 (described later) detects the flag when the program execution unit 111 executes the machining program. Thus, the block to be looked ahead by the program look-ahead unit 112 can be recognized as the "speed reduction block".

The speed information storage unit 116 calculates the feed rate at each axis in the machine tool 200 using a table feed rate at the "speed reduction block", to which a flag was added by the flag addition unit 115. Then, the speed information storage unit 116 stores feed rate information as information on the feed rates as a pair with the flag in the storage unit 150.

The flag detection unit 117 detects the flag added to the machining program when the machining program is executed after the speed information storage unit 116 stores the "feed rate information" in the storage unit 150, for example, when a second simulation is executed or when the machining program is executed after the simulation. Because the flag detection unit 117 detects the flag, the block to be looked ahead by the program look-ahead unit 112 can be recognized as the "speed reduction block".

The speed information read unit 118 reads out, from the storage unit 150, the speed information that has been stored as a pair with the flag detected by the flag detection unit 117 and applies the read-out speed information as the feed rate at each axis. The numerical controller 100 outputs an operation command that includes the speed information to the machine tool 200.

Through configuring the numerical controller 100 in this way, when executing the machining program for a second time or more, it is possible to omit calculation of the feed rate at each axis by simply performing coordinate correction when executing the "exhaustion block" as the "speed reduction block". Therefore, the occurrence of speed control becoming unstable can be reduced.

1.2 Operation of Invention

Now, the operation of the numerical controller 100 according to the first embodiment is described with reference to FIGS. 5 and 6.

1.2.1 Operation when Storing Speed Information

Figure 5:
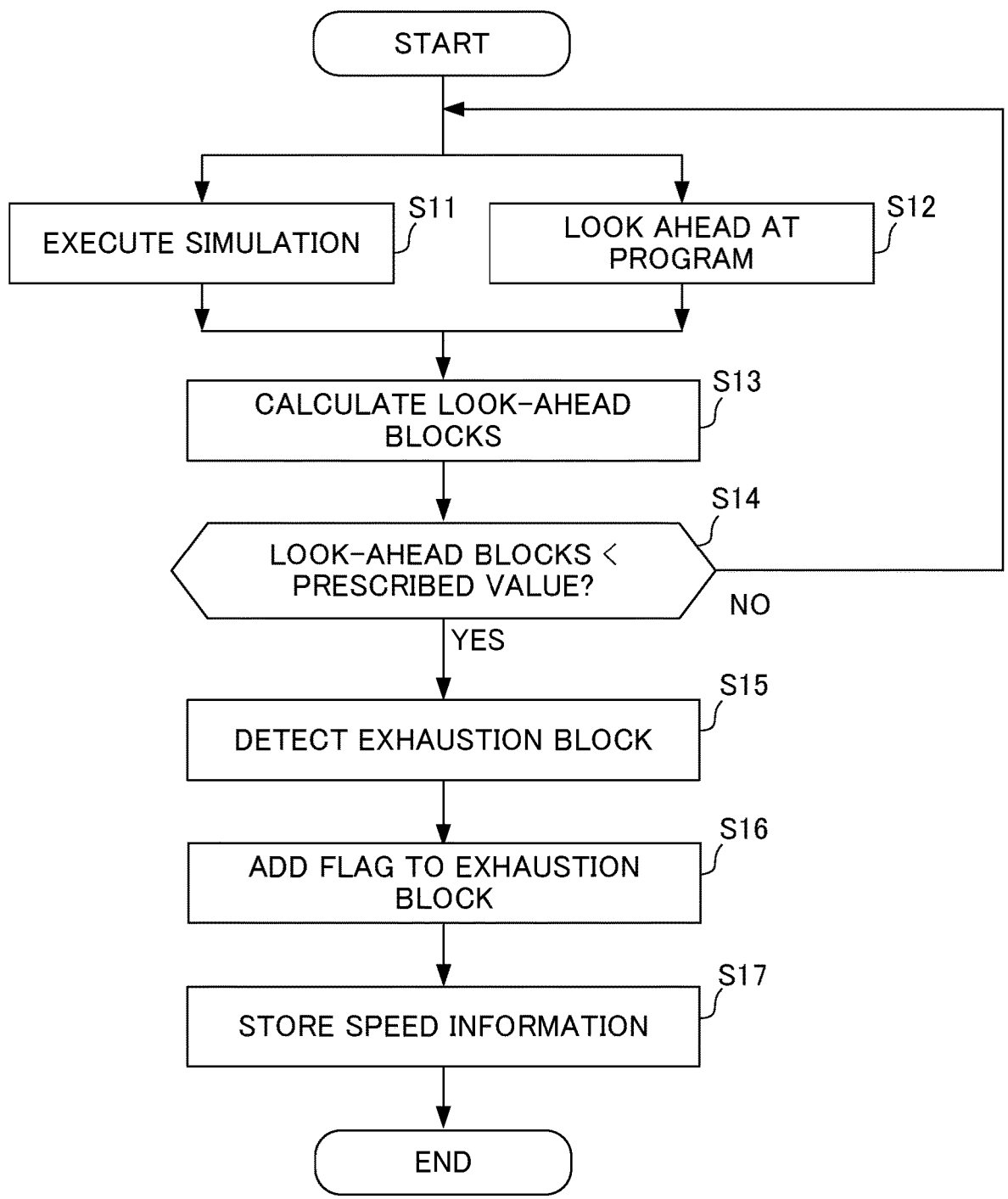
FIG. 5 is a flowchart for illustrating operation of the numerical control device according to the first embodiment of the present invention.

FIG. 5 is a flowchart for illustrating operation of the numerical controller 100 according to the first embodiment when the speed information is stored. In Step S11, the program execution unit 111 executes a simulation of the machining program.

In Step S12, in parallel with the machining program simulation executed by the program execution unit 111, the program look-ahead unit 112 looks ahead at the machining program before executing the simulation.

In Step S13, the look-ahead blocks calculation unit 113 calculates the look-ahead blocks.

In Step S14, if the look-ahead blocks falls below a prescribed value (S14: YES), the processing moves to Step S15.

If the look-ahead blocks is more than or equal to the prescribed value (S14: NO), the processing moves to Steps S11 and S12.

In S15, the exhaustion block detection unit 114 detects the "exhaustion block" as the "speed reduction block".

In Step 16, the flag addition unit 115 adds a flag to the "exhaustion block".

In Step S17, the speed information storage unit 116 calculates the feed rate at each axis in the machine tool 200 using the table feed rate at the "exhaustion block" and stores feed rate information, which is information on the feed rates, as a pair with the flag added by the flag addition unit 115 in the storage unit 150.

1.2.2 Operation when Reading Speed Information>

Figure 6:
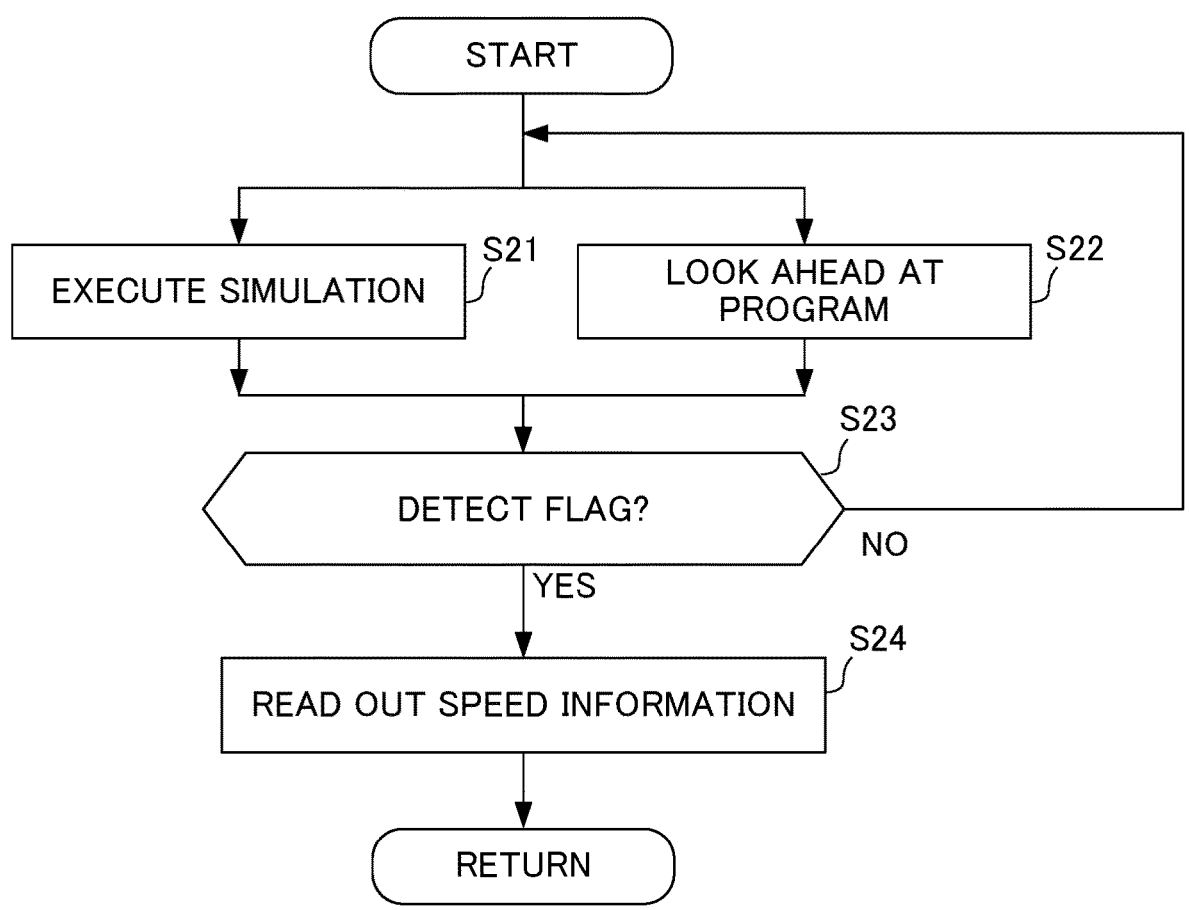
FIG. 6 is a flowchart for illustrating operation of the numerical control device according to the first embodiment of the present invention.

FIG. 6 is a flowchart for illustrating operation of the numerical controller 100 according to the first embodiment when reading out speed information. In Step S21, the program execution unit 111 executes a simulation of the machining program.

In Step S22, in parallel with the machining program simulation executed by the program execution unit 111, the program look-ahead unit 112 looks ahead at the machining program before executing the simulation.

In Step S23, if the flag detection unit 117 detects a flag in the machine program that is looked ahead by the program look-ahead unit 112 (S23: YES), the processing moves to Step S24. If the flag detection unit 117 detects no flag (S23: NO), the processing moves to Steps S21 and S22.

In Step S24, the speed information read unit 118 reads out the speed information corresponding to the flag detected by the flag detection unit 117 from the storage unit 150 and applies the speed information to the feed rate at each axel. Then, the processing moves to Steps S21 and S22 (return).

1.3 Effects of the Embodiment

The numerical controller 100 according to this embodiment detects a "speed reduction block", which is a block at which the number of blocks to be looked ahead in the machining program relatively decreases, in the machining program and stores the feed rate at each axis, which is calculated using the table feed rate at the "speed reduction block", in the storage device 150. The numerical controller 100 also reads out the speed information from the storage device 150 while the machining program is being executed and applies the speed information to the feed rate at each axis.

With this configuration, in order to stabilize feed rate and cutting speed, it is possible to detect the position in the machining program at which a speed control abnormality is likely to occur due to an insufficient number of look-ahead blocks that are used for determining the acceleration/deceleration operation.

The numerical controller 100 includes the flag addition unit 115 that adds a flag to the speed reduction block and the flag detection unit 117 that detects the flag when the machining program is executed after the speed information is stored in the storage unit 150. The speed information storage unit 116 stores the speed information and the flag as a set in the storage unit 150 and the speed information read unit 118 reads out the speed information corresponding to the flag from the storage unit 150 and applies the speed information to the feed rate at each axel when a flag is detected.

With this configuration, a plurality of pieces of speed information can be used and the speed information can be isolated from each flag and be applied as the feed rate at each axis.

The numerical controller 100 also includes the look-ahead block calculation unit 113 that calculates the look-ahead blocks, which is the difference between a first sequence number that is the number of a block being executed by the program execution unit 111 and a second sequence number that is the number of a block that is looked ahead by the program look-ahead unit 112 while the machining program is being executed, and the exhaustion block detection unit 114 that detects, as the "speed reduction block", the "exhaustion block", which is the block at which the look-ahead blocks falls below a prescribed value.

With this configuration, it is possible to detect the "speed reduction block" on the basis of the look-ahead blocks at each time point while the machining program is being executed.

2. Second Embodiment

Figure 7:
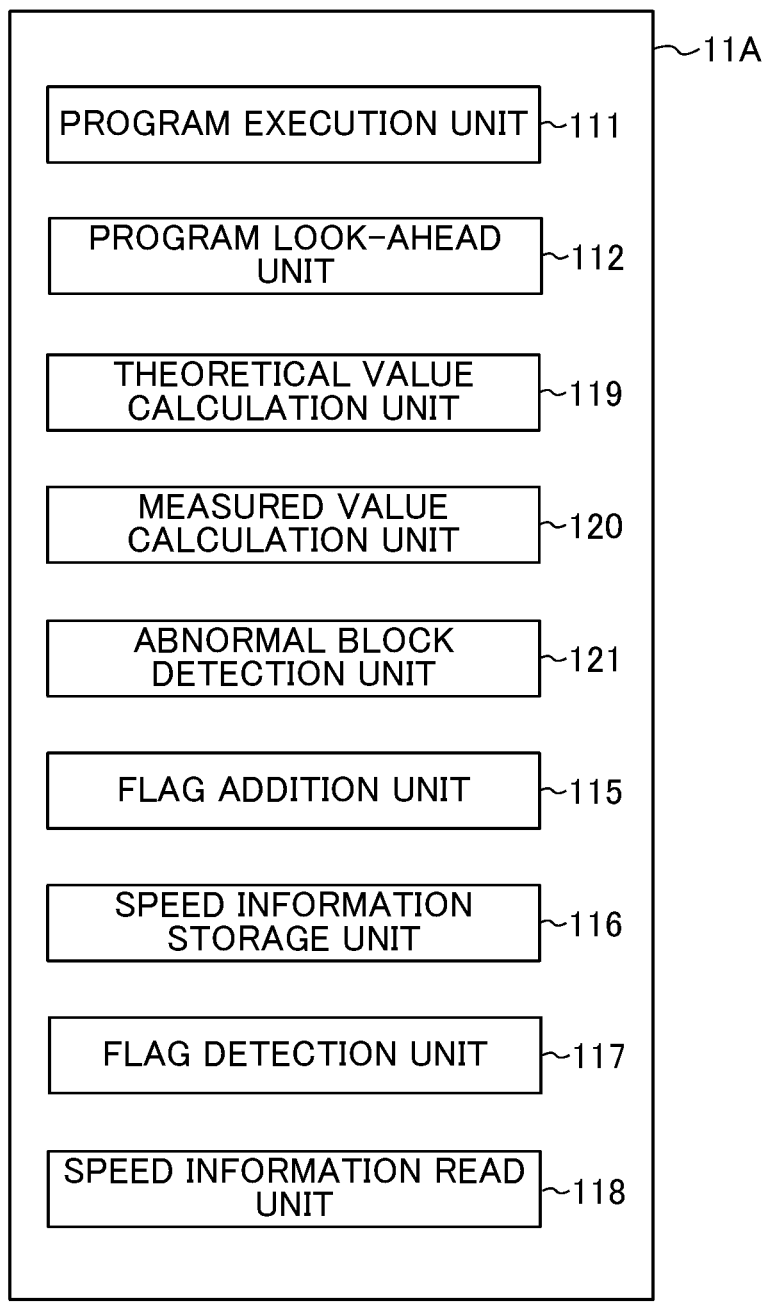
FIG. 7 is a diagram for illustrating function blocks of a numerical control device according to a second embodiment of the present invention.

A second embodiment of the present invention is now described with reference to FIGS. 7 and 8. For the sake of brevity, only components of a numerical controller 100A according to the second embodiment that are different to those of the numerical controller 100 are described herein.

2.1 Configuration of Invention

The numerical controller 100A according to the second embodiment includes a CPU 11A in place of the CPU 11. FIG. 7 is a function block diagram for illustrating a function where the CPU 11A reads out system programs and application programs stored in the ROM 12 via the bus 25 and implements the present invention according to those system programs and application programs.

The CPU 11A is different to the CPU 11 in that the CPU 11A does not include the look-ahead blocks calculation unit 113 or the exhaustion block detection unit 114 and instead includes a theoretical value calculation unit 119, a measured value calculation unit 120 and an abnormal block detection unit 121.

The theoretical value calculation unit 119 calculates theoretical values per block in the processing time for the machining program from the feed rate of the machine tool 200 and the lengths of minute straight lines that make up the machining path followed by the machine tool 200.

More specifically, the theoretical value calculation unit 119 calculates the theoretical values for the program execution processing time according to the following Equation (1):

Theoretical values for program execution processing time (msec)=60×lengths of minute straight lines (mm)/command speed (mm/min)     (1)

The measured value calculation unit 120 calculates actually measured values per block in the total time of the look-ahead time taken by the program look-ahead unit 112 and the processing time for the machining program while the program execution unit 111 executes the machining program.

The abnormal block detection unit 121 compares the total of theoretical values per block in the processing time for the machining program calculated by the theoretical value calculation unit 119 and the total of the actually measured values per block in the look-ahead time taken by the program look-ahead unit 112 and the actual processing time for the machining program executed by the program execution unit 111, which is calculated by the measured value calculation unit 120. A block at which the result of subtracting the total of the theoretical values from the total of the measured values is more than a prescribed value is detected as an "abnormal block." This "abnormal block" is a block at which a speed control abnormality is relatively likely to occur compared to other blocks.

In the second embodiment, the abnormal block detection unit 121 detects the "abnormal block" as the "speed reduction block".

Through configuring the numerical controller 100A in this way, when executing the machining program for a second time or more, it is possible to omit calculation of the feed rate at each axis by simply performing coordinate correction when executing the "abnormal block" as the "speed reduction block". Therefore, the occurrence of speed control becoming unstable can be reduced.

2.2 Operation of Invention

Operation of the numerical controller 100A according to the second embodiment is now described with reference to FIG. 8.

<2.2.1 Operation when Storing Speed Information>

Figure 8:
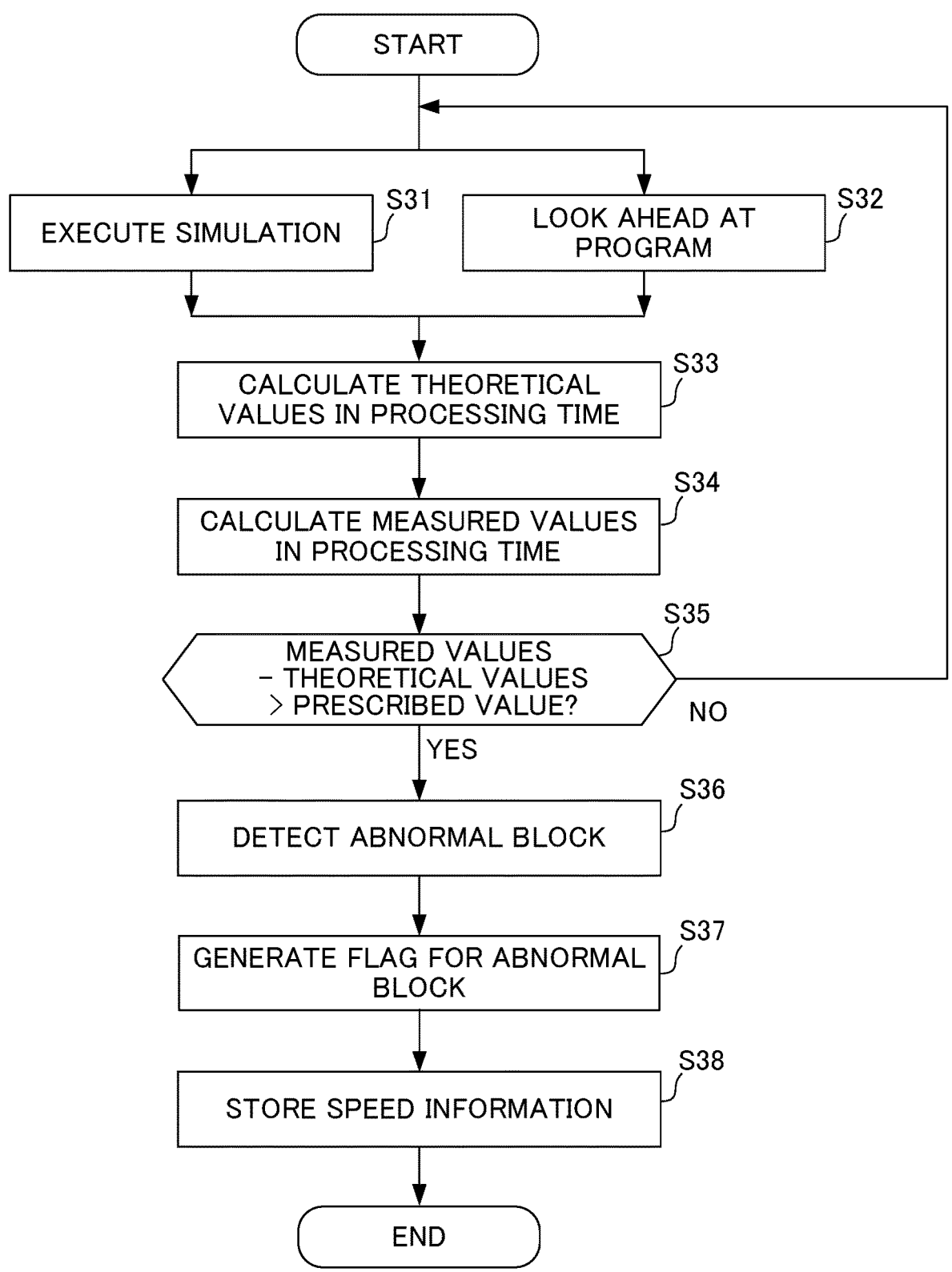
FIG. 8 is a flowchart for illustrating operation of the numerical control device according to the second embodiment of the present invention.
Figure 9:
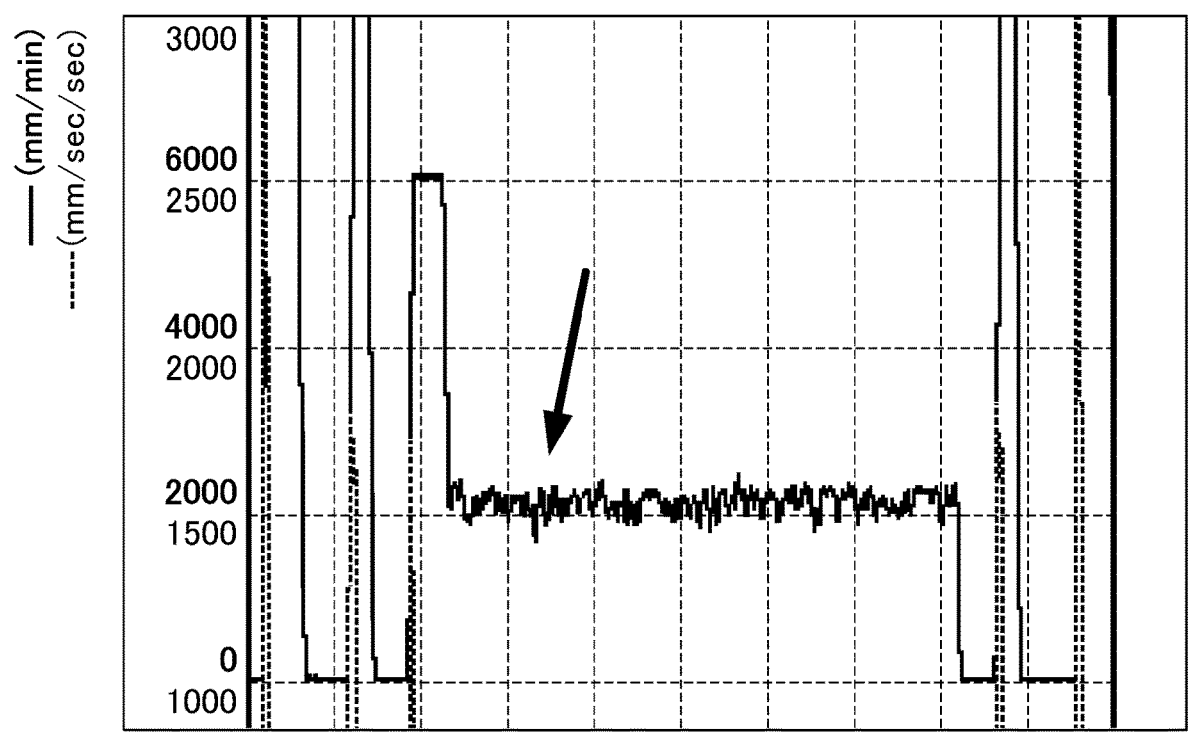
FIG. 9 is a graph for showing instability of speed due to inability to secure the look-ahead blocks.

FIG. 8 is a flowchart for illustrating the operation of the numerical controller 100A according to the second embodiment when speed information is stored. In Step S31, the program execution unit 111 executes a simulation of the machining program.

In Step S32, in parallel with the simulation of the machining program executed by the program execution unit 111, the program look-ahead unit 112 looks ahead at the machining program before the simulation is executed.

In Step S33, the theoretical value calculation unit 119 calculates theoretical values per block in the processing time for the machining program from the feed rate of the machine tool 200 and the lengths of minute straight lines that make up the machining path followed by the machine tool 200.

In Step S34, the measured value calculation unit 120 calculates actually measured values per block in the total of the look-ahead time taken by the program look-ahead unit 112 and the processing time for the machining program while the program execution unit 111 executes the simulation of the machining program.

In Step S35, if the result of subtracting the total of theoretical values per block from the total of actually measured values per block is more than a prescribed value (S35: YES), the processing moves to Step S36. If the result is less than or equal to the prescribed value (S35: NO), the processing moves to Steps S31 and S32.

In Step S36, the abnormal block detection unit 121 detects the "abnormal block" as the "speed reduction block".

In Step S37, the flag addition unit 115 adds a flag to the "abnormal block."

In Step S38, the speed information storage unit 116 calculates the feed rate at each axis of the machine tool 200 using a table feed rate at the "abnormal block" and stores feed rate information as information on the feed rates as a pair with the flag added by the flag addition unit 115 in the storage unit 150.

<2.2.2 Operation when Reading Speed Information>

Operation of the numerical controller 100A according to the second embodiment when reading out speed information is the same operation as the numerical controller 100 according to the first embodiment when reading out speed information, and therefore a description thereof is omitted.

2.3 Effects of Embodiment

In order to detect the "speed reduction block", the numerical controller 100A includes: the theoretical value calculation unit 119 that calculates theoretical values per block in the processing time for the machining program from the lengths of minute straight lines that makeup the machining path taken by the machining tool 200 and the feed rate of the machining tool 200; the measured value calculation unit 120 that calculates actually measured values per block in the processing time for the machining program and the look-ahead time taken by the program look-ahead unit 112 while the machining program is being executed; and the abnormal block detection unit 121 that detects an "abnormal block", which is a block at which the result of subtracting the total of theoretical values from the total of actually measured values is more than a prescribed value.

With this configuration, it is possible to detect the "speed reduction block" on the basis of the difference between the theoretical values and the actually measured values in the processing time at each time point when the machining program is executed.

3. Modification Examples

3.1 Modification Example 1

As illustrated in FIG. 1, in the first and second embodiments, it is assumed that one numerical controller 100, one storage device 150 and one machine tool 200 come as a set, but the present invention is not limited to this configuration. For example, particularly if a plurality of numerical controllers 100 are to execute the same process of processing, the plurality of numerical controllers 100 may be connected to one storage device 150 and the speed information stored in that one storage device 150 may be shared between the plurality of numerical controllers 100.

3.2 Modification Example 2

The numerical controller 100 according to the first embodiment calculates the feed rate at each axis from the table feed rate at the exhaustion block and stores speed information as information on the feed rates as a pair with the flag in the storage device 150. Further, the numerical controller 100 reads out the speed information stored in the storage device 150 and applies the speed information as the feed rate at each axis. However, the numerical controller 100 is not limited to this configuration. For example, the numerical controller 100 may store, in the storage device 150, speed information on table feed rate at any block other than the exhaustion block in the machining program or all blocks in the machining program as pairs with flags corresponding to each piece of speed information, read out the speed information stored in the storage device 150 and apply the speed information as the feed rate at each axis. Similarly, the numerical controller 100A according to the second embodiment calculates the feed rate at each axis from the table feed rate at the abnormal block, stores speed information as information on the feed rates as a pair with the flag in the storage unit 150, reads out the speed information stored in the storage device 150 and applies the speed information to the feed rate at each axis. However, the numerical controller 100A is not limited to such a configuration. For example, the numerical controller 100A may store, in the storage device 150, speed information on table feed rate at any block other than the abnormal block in the machining program or all blocks in the machining program as pairs with flags corresponding to each piece of speed information, read out the speed information stored in the storage device 150 and apply the speed information as the feed rate at each axis.

3.3 Modification Example 3

In the above-described embodiment, the exhaustion block detection unit 114 defines an exhaustion block as a block at which the look-ahead blocks falls below a prescribed value, but the present invention is not limited to this configuration. For example, the exhaustion block detection unit 114 may define an exhaustion block as a block at which the rate of reduction of the look-ahead blocks exceeds a prescribed value.

3.4 Modification Example 4

In the second embodiment, the abnormal block detection unit 121 compares the total of theoretical values per block in the processing time for the machining program calculated by the theoretical value calculation unit 119 and the total of the actually measured values per block in the look-ahead time taken by the program look-ahead unit 112 and the actual processing time for the machining program executed by the program execution unit 111, which is calculated by the measured value calculation unit 120, and defines a block at which the result of subtracting the total of the theoretical values from the total of the measured values is more than a prescribed value is an "abnormal block." However, the present invention is not limited to this configuration. For example, the abnormal block detection unit 121 may define a block at which the ratio of the total number of actually measured values to the total number of theoretical values exceeds a prescribed value as the abnormal block.

3.5 Modification Example 5

In the above-described embodiments, the flag addition unit 115 adds a flag to the speed reduction block, the speed information storage unit 116 stores the speed information in the storage unit 150 as a pair with the flag, the flag detection unit 117 detects the flag while the machining program is being executed after the speed information is stored in the storage unit 150, and the speed information read unit 118 reads out the speed information corresponding to the flag from the storage unit 150 when the flag is detected and applies the speed information as the feed rate at each axis. However, the present invention is not limited to this configuration. For example, if there is only one piece of speed information stored in the storage unit 150, the speed information storage unit 116 may store only the speed information in the storage device 150 and the speed information read unit 118 may read out the speed information from the storage unit 150 without using flags for differentiating between the pieces of speed information.

3.6 Modification Example 6

In the above-described embodiment, the operation when storing the speed information and the operation when reading out the speed information are performed when the program execution unit 111 executes the machining program simulation, but the present invention is not limited to this configuration. For example, similar operations may be performed during actual machining in which the numerical controller 100 controls the machine tool 200.

An embodiment of the present invention has been described above, but the present invention is not limited to the above-described embodiment. Any described effects are merely the best effects achieved by the present invention and are not limited to the description provided herein.

The control method used by the numerical controller 100 or 100A is implemented by software. When using software, the programs that constitute said software are installed on a computer (numerical controller 100 or 100A). These programs may be recorded on a removable medium and distributed to a user or may be made available as a file to be downloaded by a user to a computer via a network. These programs may also be provided to a user's computer (numerical controller 100 or 100A) as an Internet service via a network, instead of being downloaded.

EXPLANATION OF REFERENCE NUMERALS 10 control system
100 numerical controller
111 program execution unit
112 program look-ahead unit
113 look-ahead blocks calculation unit (speed reduction block detection unit)
114 exhaustion block detection unit (speed reduction block detection unit)
115 flag addition unit
116 speed information storage unit
117 flag detection unit
118 speed information read unit
119 theoretical value calculation unit
120 measured value calculation unit
121 abnormal block detection unit (speed reduction block detection unit)
150 storage unit
200 machine tool

What is claimed is:

1. A numerical controller that is connected to a machine tool having axes and a storage device and that controls the machine tool by executing a machining program that is made up of a plurality of blocks and that controls acceleration/deceleration of the axes, the numerical controller comprising:
 a program execution unit that runs the machining program;
 a program look-ahead unit that looks ahead at the machining program in parallel with running the machining program;
 a speed reduction block detection unit that detects a speed reduction block in the machining program, where the speed reduction block is a block at which the number of blocks to be looked ahead decreases relative to a prescribed value;
 a speed information storage unit that calculates feed rate at each of the axes from a table feed rate at the speed reduction block and stores speed information which is information on the feed rates in the storage unit; and
 a speed information read unit that reads out the speed information from the storage unit and applies the speed information as the feed rate at each of the axes;
 wherein, when executing the speed reduction block during actual machining, calculation of a feed rate at each axis using the speed reduction block is omitted and the speed information is used instead, to control the acceleration/deceleration of one or more of the axes to stabilize the feed rate at each of the one or more axes.

2. The numerical controller according to claim 1, further comprising:
 a flag addition unit that adds a flag to the speed reduction block; and
 a flag detection unit that detects the flag while the machining program is being executed after the speed information has been stored in the storage device,
 wherein the speed information storage unit stores the speed information in the storage unit as a pair with the flag, and
 wherein, when the flag is detected, the speed information read unit reads out the speed information corresponding to the flag from the storage device and applies the speed information to the feed rate at each axis.

3. The numerical control device according to claim 1, wherein the speed reduction block detection unit includes:
 a look-ahead blocks calculation unit that calculates a look-ahead blocks, which is the difference between a first sequence number that is the number of a block being executed by the program execution unit and a second sequence number that is the number of a block that is looked ahead by the program look-ahead unit while the machining program is being executed; and
 an exhaustion block detection unit that detects, as the speed reduction block, an exhaustion block, which is a block at which the look-ahead blocks falls below the prescribed value.

4. The numerical controller according to claim 1, wherein the speed reduction block detection unit includes:
 a theoretical value calculation unit that calculates theoretical values per block in the processing time for the machining program from the feed rate of the machine tool and the lengths of minute straight lines that make up the machining path followed by the machine tool;
 a measured value calculation unit that calculates actually measured values per block in look-ahead time taken by the program look-ahead unit and the processing time for the machining program while the machining program is executed; and
 an abnormal block detection unit that detects, as the speed reduction block, an abnormal block that is a block at which the result of subtracting the total of the theoretical values from the total of the measured values is more than the prescribed value.

5. A numerical control system comprising:
 a plurality of the numerical controllers of claim 1; and
 a storage unit,
 wherein the speed information stored in the storage unit is shared between the plurality of numerical controllers.

* * * * *